United States Patent [19]

Foldvari et al.

[11] Patent Number: 4,533,926

[45] Date of Patent: Aug. 6, 1985

[54] STRIP CHART RECORDER AND MEDIUM STATUS

[75] Inventors: Tibor L. Foldvari, Cheshire; Donald R. Boucher, Meriden, both of Conn.; Eugene L. Flanagan, III, Manhasset, N.Y.

[73] Assignee: American Home Products Corporation (Del.), New York, N.Y.

[21] Appl. No.: 452,538

[22] Filed: Dec. 23, 1982

[51] Int. Cl.³ .................... G01D 15/24; B65H 25/24; G03B 27/52

[52] U.S. Cl. .................... 346/136; 250/548; 250/557; 355/41; 355/51

[58] Field of Search .................... 346/76 PH, 136; 250/223 R, 557; 235/473; 340/675; 355/14 R, 29, 38, 133, 16, 23, 51; 360/137, 33; 356/431; 369/45; 430/401

[56] References Cited

U.S. PATENT DOCUMENTS

| | | | |
|---|---|---|---|
| 2,077,242 | 4/1937 | La Pierre | 346/136 |
| 2,796,316 | 6/1957 | Cooley | 346/139 |
| 3,713,168 | 1/1973 | Baker | 346/74 E |
| 3,977,785 | 8/1976 | Harris | 355/133 |
| 4,091,913 | 5/1978 | Ku et al. | 400/124 |
| 4,176,944 | 12/1979 | Payrhammer | 355/18 |
| 4,213,135 | 7/1980 | Medvecky | 346/76 PH |
| 4,247,204 | 1/1981 | Merlen et al. | 356/431 |
| 4,266,123 | 5/1981 | Friberg | 250/205 X |
| 4,286,145 | 8/1981 | Palmer | 235/454 X |
| 4,320,960 | 3/1982 | Ward et al. | 355/14 R |
| 4,344,701 | 8/1982 | Klose et al. | 355/51 |
| 4,392,056 | 7/1983 | Weyandt | 250/339 X |

Primary Examiner—E. A. Goldberg
Assistant Examiner—Gerald E. Preston
Attorney, Agent, or Firm—Edward M. Blocker

[57] ABSTRACT

Novel strip chart recorders and strip chart recording paper are provided which are cooperable so that the recorder detects the proximity of a terminal edge of the paper, so that the recorder can signal this occurrence to the user enabling him to insert a new supply of strip chart paper in the recorder to avoid the loss of data. The recorder also cooperates with the strip chart paper to determine when paper is absent from the recorder, for example, when it has been exhausted, thereupon to signal this further occurrence to the user and take steps to avoid damage to the recorder which can result through its operation in the absence of paper in the recorder mechanism.

6 Claims, 7 Drawing Figures

STRIP CHART RECORDER AND MEDIUM STATUS

BACKGROUND OF THE INVENTION

The present invention relates to strip chart recorders and strip chart paper for use therein.

Strip chart recorders provide a means of producing a permanent record of data for numerous uses. For example, in physiological monitoring, it is frequently desirable to make a permanent record of data from a patient monitor for diagnostic purposes. When making a record of medical data, it is especially important that all data of interest be recorded without interruption. However, if the supply of strip chart recording paper in the recorder is exhausted unknown to the user, time is lost while a new supply of paper is installed in the recorder and important data can be lost.

A further hazard exists in the use of strip chart recorders which utilize thermal print heads to make a record on heat sensitive strip chart paper. Typically, the thermal print head is disposed to press the paper between the head and a moving printing platen, so that the paper is pressed closely against the print head by the platen as the platen advances the paper. The platen must have a high coefficient of friction to ensure that the paper will not slip. Consequently, if the paper between the print head and the platen runs out, the platen may damage the relatively fragile thermal print head through abrasion if the platen continues to move.

Some suppliers of strip chart paper provide a small mark near the end of each roll of paper so that the user may determine that the end of the paper is near if the user should happen to see the mark. However, such markings are intentionally made unobstrusive to avoid obscuring data and, therefore, are not often seen by the user before the paper runs out. The user also is often preoccupied with other matters. Accordingly, the low paper condition frequently is not noticed.

SUMMARY OF THE INVENTION

In accordance with one aspect of the present invention, a strip chart recorder is provided, comprising a device for recording data on strip chart paper; means for advancing the strip chart paper past the recording device; and means for detecting an indicator on the strip chart paper to signal the proximity of the end of the strip chart paper.

In accordance with a further aspect of the present invention, strip chart recording paper is provided comprising a sheet of paper having a first edge adapted to be introduced into a strip chart recorder to record data on the sheet of paper by a recording device of the strip chart recorder; the sheet of paper having a second edge opposite the first edge; the sheet of paper having means thereon for cooperating with a detector of the strip chart recorder so that the detector is enabled to sense the proximity of the second edge to the recording device.

The present invention may be utilized for a number of different purposes. For example, the detection of the proximity of the end of the strip chart paper may be signaled to the user in such a manner as to attract his attention. In accordance with various aspects of the present invention, either or both of visual and audible indicators are utilized for this purpose.

In accordance with still other aspects of the present invention the detecting means is operative to stop the operation of the strip chart recorder when a predetermined amount of strip chart paper has been advanced by the advancing means after the proximity of the end of the paper has been signaled. According to yet another aspect of the present invention, a strip chart recorder is provided, comprising a device for recording data on strip chart paper provided for use in the recorder; means for advancing the strip chart paper past the recording device; and means for disabling the advancing means in the absence of strip chart paper in the recorder. The provision of such disabling means is especially advantageous in thermal recorders for avoiding damage to the relatively fragile thermal print head due to the rotation of the platen thereagainst in the absence of paper in the recorder and due to excessive heating of the print head without paper thereagainst.

BRIEF DESCRIPTION OF THE DRAWINGS

The present invention, as well as further objects and features thereof, will be understood more clearly and fully from the following description of certain preferred embodiments when read with reference to the accompanying drawings, in which.

DETAILED DESCRIPTION OF CERTAIN PREFERRED EMBODIMENTS

Figure 1:
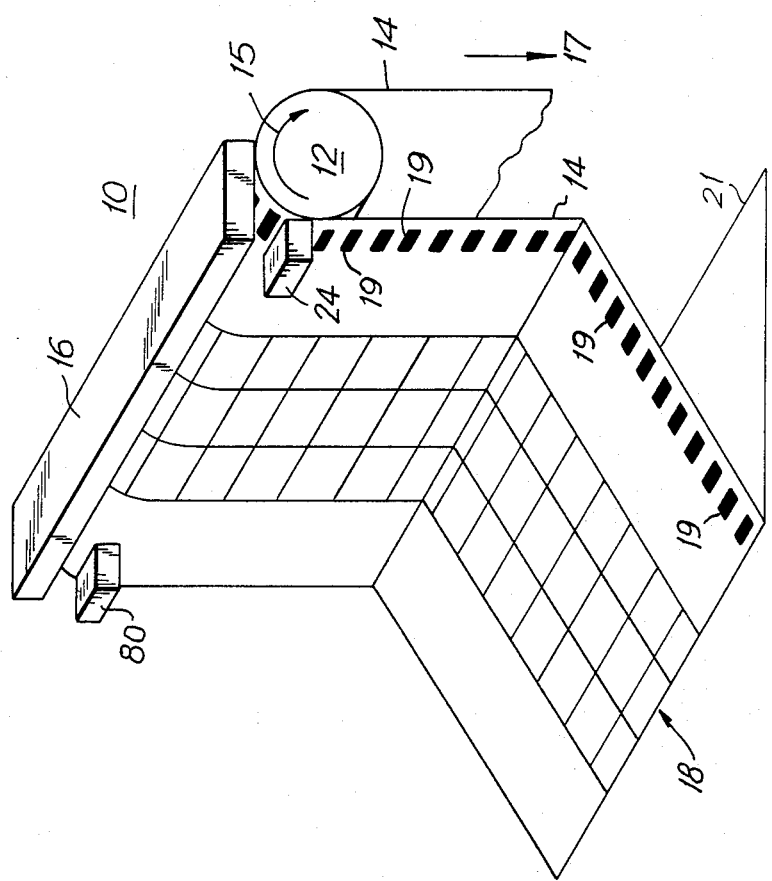
FIG. 1 is a perspective view of a portion of a strip chart recorder and strip chart recording paper therein, in accordance with the present invention.

With reference first to FIG. 1, a strip chart recorder mechanism 10 includes a drive roller 12 about which a section of Z-fold strip chart paper 14 is arranged to be driven thereby at a controlled rate in the direction indicated by arrow 15. The drive roller 12 also serves as a printing platen for holding the strip chart paper 14 against the printing elements of a multidot thermal print head 16. The paper 14 is loaded in the mechanism 10 by threading a leading edge (indicated by arrow 17) of the paper 14 between the roller 12 and the print head 16. Strip chart paper 14 has a strip chart scale 18 printed thereon and so arranged that the thermal elements of the print head 16 may be energized to create a trend record on the strip chart scale 18 as the paper 14 is driven past the print head 16 by the drive roller 12.

It will be appreciated that, in the absence of the paper 14 between the thermal print head 16 and the drive roller 12, the drive roller 12 will rub against the thermal print elements of the print head 16, which will gradually wear away the protective coating on the print elements and eventually destroy the usefulness of the print head 16. This could occur for example, where the supply of strip chart paper in the recorder is exhausted before the user notices and shuts off the recorder. In addition, should the paper be used up while important data is being recorded, this data will be lost. In order to permit the recorder to detect that the end of the strip chart paper 14 is approaching, the paper 14 is provided with a plurality of juxtaposed machine-readable indicia 19 each arranged a unique, predetermined distance from a terminal edge 21 of the strip chart paper 14 and parallel to a lateral edge thereof, to indicate to the recorder the proximity of edge 21. When the terminal edge 21 of the paper 14 has come within a predetermined distance from the print head 16 and the drive roller 12, a detector 24, arranged adjacent the roller 12 about 90° ahead of the print head 16 intercepts the indicia 19 to indicate their presence by emitting an appropriate signal. This signal may be utilized to produce a further signal to the user indicating the imminent exhaustion of the strip chart paper. In addition, by providing the strip chart paper 14 with a known number of indicia 19, a signal from the detector 24 may be utilized to count the number of indicia 19 which have passed by the detector so that, when a predetermined number have been counted, the recorder is turned off as the paper is exhausted.

Figure 2:
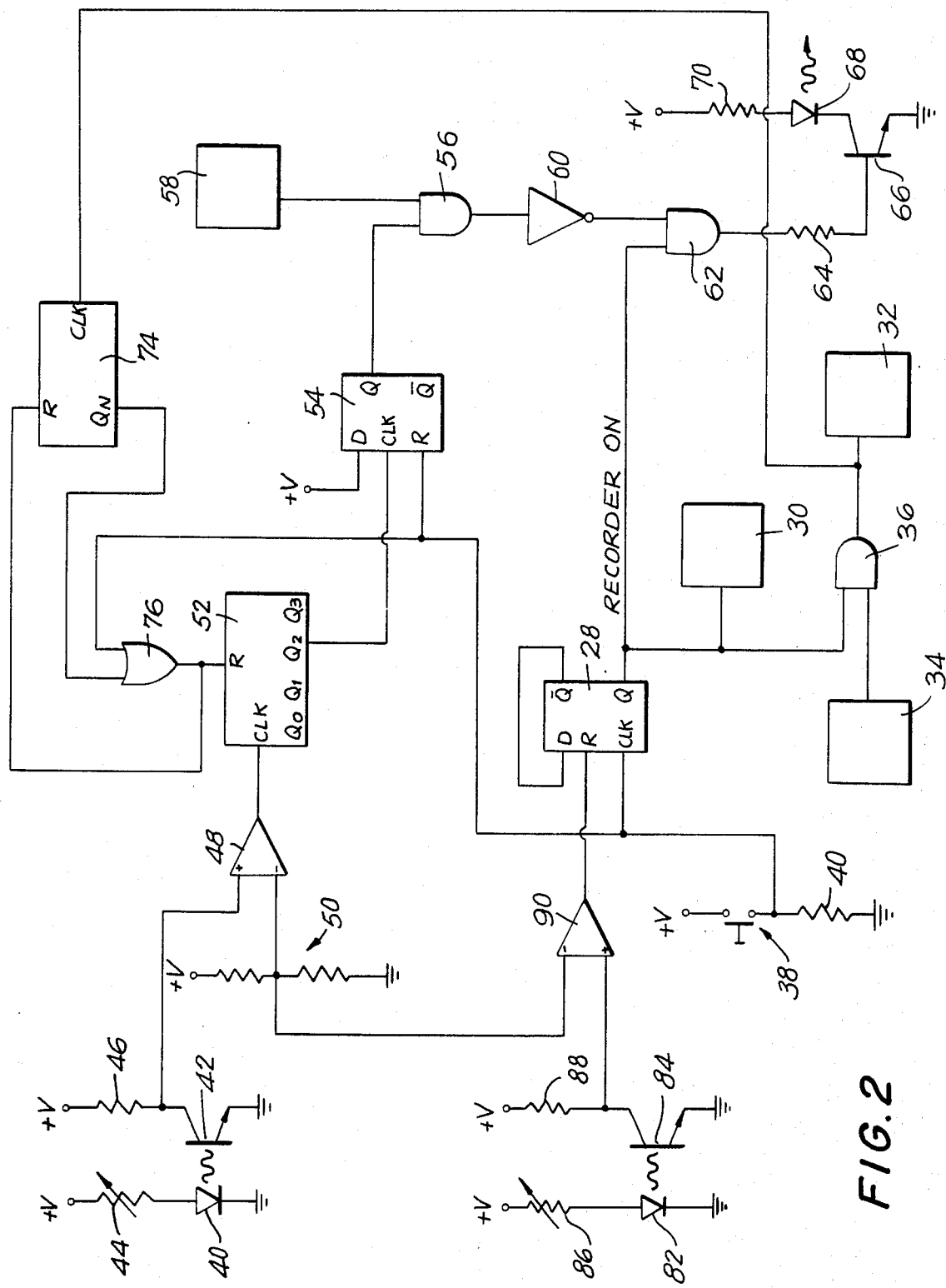
FIG. 2 is a schematic diagram of one embodiment of a strip chart recorder control circuit for use in the present invention.

In the control circuit of FIG. 2, a first D-type flip-flop 28 provides a RECORDER ON signal at its Q output terminal. The Q output terminal is connected to an enable input of a printing control circuit 30 for controlling the operation of print head 16. When the Q terminal of flip-flop 28 is high, indicating that the recorder is ON, circuit 30 is enabled to provide printing control signals to head 16. The RECORDER ON signal is also utilized to control the provision of enabling pulses to a control circuit 32 which amplifies the pulses to drive a stepping motor (not shown) coupled to rotate the drive roller 12. The enabling pulses are produced by a first clock 34 capable of varying the frequency of the pulses under operator control for varying the speed of the drive roller 12. Clock 34 provides the pulses at an output terminal coupled to a first input of a two input AND gate 36. The second input of AND gate 36 is coupled to the Q terminal of flip-flop 28. When the Q terminal is high, AND gate 36 will gate the pulses from clock 34 to an output terminal of AND gate 36, which in turn is coupled with control circuit 32 to provide the enabling pulses thereto. Therefore, the state of the Q terminal of flip-flop 28 controls the enabling of both the printing and paper advancing functions of the strip chart recorder.

A momentary contact switch 38 permits the operator to toggle the Q terminal of flip-flop 28 from the OFF state to the ON state and vice versa to either enable or disable the recorder. A first terminal of switch 38 is connected to a source of positive DC voltage +V and a second terminal of switch 38 is coupled to a first terminal of a fixed resistor 40 whose other terminal is connected to ground. The second terminal of switch 38 is connected to the clock (CLK) input of flip-flop 28. The $\overline{Q}$ terminal of flip-flop 28 is connected to the D terminal thereof. Accordingly, every time switch 38 is closed, the state of $\overline{Q}$ will be clocked into D to toggle the state of Q.

In the embodiment of strip chart paper 14 shown in FIG. 1, the indicia 19 are optically encoded, darkened areas printed on the paper 14 which has a light reflecting surface, so that as the indicia 19 pass by the detector 24, a succession of areas having contrasting optical reflectivity are presented to the detector 24. With reference also to FIG. 2, the detector 24 comprises a light emitting diode 40 operative to project a light beam on the strip chart paper 14 and a photo transistor 42 positioned adjacent the diode to receive light from the beam emitted by the diode and reflected by the surface of the strip chart paper 14 pass by the diode 40 and the photo transistor 42 as the edge 21 of the paper approaches, the photo transistor 42 will be rendered successively conductive and nonconductive as light is reflected by the undarkened areas and the darkened areas 19 of the strip chart paper 14.

The anode of diode 40 is connected to a first terminal of a variable resistor 44 of which a second terminal is connected to +V, which is a standard TTL supply voltage. The cathode of diode 40 is connected to ground. Therefore, diode 40 will be operative to emit a continuous beam of light towards the strip chart paper 14. The variable resistor 44 serves to adjust the intensity of the light beam emitted by the diode 40. Photo transistor 42 is an NPN transistor having its emitter lead connected to ground and its collector lead connected to the first terminal of a fixed resistor 46 of which the second lead is connected to +V. So long as sufficient light is reflected by the paper 14 to the base region of the transistor 42, transistor 42 will be rendered conductive through resistor 46 thus to lower the voltage at the first terminal thereof nearly to ground potential. When insufficient light is incident on the base region of the transistor 42, for example when one of the light absorbing areas 19 of the paper 14 is passing beneath the detector 24, transistor 42 will be rendered nonconductive, thus raising the voltage appearing at the first terminal of resistor 32 to approximately +V. To minimize the effects of ambient light, diode 40 and transistor 42 are preferably infrared devices.

The collector output of transistor 42 is coupled to the non-inverting input terminal of a comparator 48. The inverting input terminal of comparator 48 is connected to a resistive voltage divider 50 providing an invarying voltage $\frac{1}{2}+V$ to the inverting input terminal of comparator 48. Therefore, comparator 48 provides at its output a signal having two stable states indicative of the conductivity of transistor 42 and, thus, of the amount of light received thereby from diode 40.

A four bit synchronous counter 52 has a clock input (CLK) connected to the output of comparator 48 for developing a count signal at its Q outputs representative of the number of indicia 19 that have passed by detector 24 as indicated by the number of pulses generated by transistor 42. Counter 52 is operative to set a second D type flip-flop 54 upon counter 52 achieving a predetermined count, for example 0100 binary in this embodiment. For this to occur, flip-flop 54 has its D terminal connected to +V and its clock input (CLK) connected to Q2 to counter 52, so that when Q2 first goes high, i.e. upon the count reaching 0100 binary, the high voltage on the D terminal sets flip-flop 54.

The Q output of flip-flop 54 connected to a first input of a two input AND gate 56. The second input of AND gate 56 is connected to the output of a 1 Hz square wave oscillator 58. The output of AND gate 56 is coupled through an inverter 60 to the first input of another two input AND gate 62.

The output of AND gate 62 is coupled through a resistor 64 to the base of an NPN transistor 66. The emitter of transistor 66 is connected to ground and the collector is connected to the cathode of a light emitting diode 68. The anode of diode 68 is coupled through a fixed resistor 70 to +V. It will be appreciated that diode 68 will be illuminated so long as the output, and therefore both inputs, of AND gate 62 are high. This condition is fulfilled so long as the Q terminal of flip-flip 28 is high (indicating that the recorder is ON) and the output of AND gate 56 is low. Therefore, diode 68 will be continuously on while the recorder is operating and a low paper condition does not exist (i.e. flip-flop 54 is reset). When the detector 24 detects the passage of the predetermined number of indicia 19 signalling a low paper condition, flip-flop 54 will be set by a high state on Q2 of counter 52, thus to enable gate 56 to couple the 1 Hz pulses from oscillator 58 through inverter 60 and gate 62 to cause diode 68 to emit a 1 Hz pulsating light beam. Diode 68 is positioned so that its emissions are plainly visible to the user to signal the low paper condition.

To avoid indicating an erroneous "low paper" condition due to ambient light noise or to extraneous marks on the paper, counter 52 is reset periodically automatically after a predetermined amount of chart paper has been advanced by the recorder. The speed of advancement of the paper is proportional to the frequency of the pulses produced at the output of AND gate 36. The output of AND gate 36 is coupled to the clock (CLK) input of a second synchronous counter 74. When counter 74 reaches a predetermined count indicated by a high state on an output QN thereof, this causes the output of an OR gate 76, having an input coupled to terminal QN, to go high. The output of OR gate 76 is connected to the reset (R) terminal of counter 52 to reset counter 52 and also to the reset (R) terminal of counter 74 to reset counter 74. Accordingly, counter 52 will only output a 0100 binary count to set flip-flop 54 if at least four pulses are produced by transistor 42 within the time necessary for the paper to advance the predetermined distance represented by the low to high transition on QN of counter 74.

With reference again to FIG. 1, a second detector 80 is disposed adjacent a lateral edge of the paper 14 and facing drive roller 12 about 90° ahead of print head 16. Referring also to FIG. 2, detector 80 includes a light emitting diode 82 and a photo transistor 84 positioned to receive light emitted from diode 82 and reflected back onto detector 80. Diode 82 is continuously illuminated throught the coupling of its anode through a variable resistor 86 to +V and the connection of its cathode to ground. Transistor 84 has its emitter connected to ground and its collector coupled to +V through a resistor 88. The collector of transistor 84 is connected to the non-inverting input of a comparator 90, whose inverting input is coupled to voltage divider 50 to maintain the inverting input at $\frac{1}{2}$+V. The output of comparator 90 is connected to the reset (R) terminal of flip-flop 28.

So long as the chart paper 14 is between the detector 80 and the drive roller 12, the light from diode 82 will be reflected from the paper to maintain transistor 84 conductive. This will maintain the output of comparator 90 low preventing a reset of flip-flop 28 which would disable the recorder. However, the surface of roller 12 is light absorbing and, when the edge 21 of paper 14 advances beyond detector 80, it exposes the surface of roller 12 to detector 80 which absorbs the light from diode 82 and causes the collector of transistor 84 to go high, thus to reset flip-flop 28. Thereupon, the Q terminal of flip-flop 28 goes low, disabling the motor control circuit 32 to prevent the roller 12 from damaging print head 16 by rotating thereagainst in the absence of chart paper between roller 12 and print head 16. In addition, the printing control 30 is disabled. Since one input of AND gate 62 is low, its output is now low, shutting off current to diode 68 to prevent its illumination. This then signals to the user the exhaustion of the paper and the shut down of the recorder as a consequence.

When the user replaces the supply of chart paper, and restarts the recorder by closing switch 38 to reset flip-flop 28, this also resets flip-flop 54 and counter 52, respectively, through the coupling of the reset terminal of flip-flop 54 and the reset terminal of counter 52 (through a second input of OR gate 76) to the second terminal of switch 38. Likewise, counter 74 is reset through OR gate 76. Accordingly, the circuit is automatically reset upon the replacement of paper and activation of switch 38 to restart the recorder.

Figure 3:
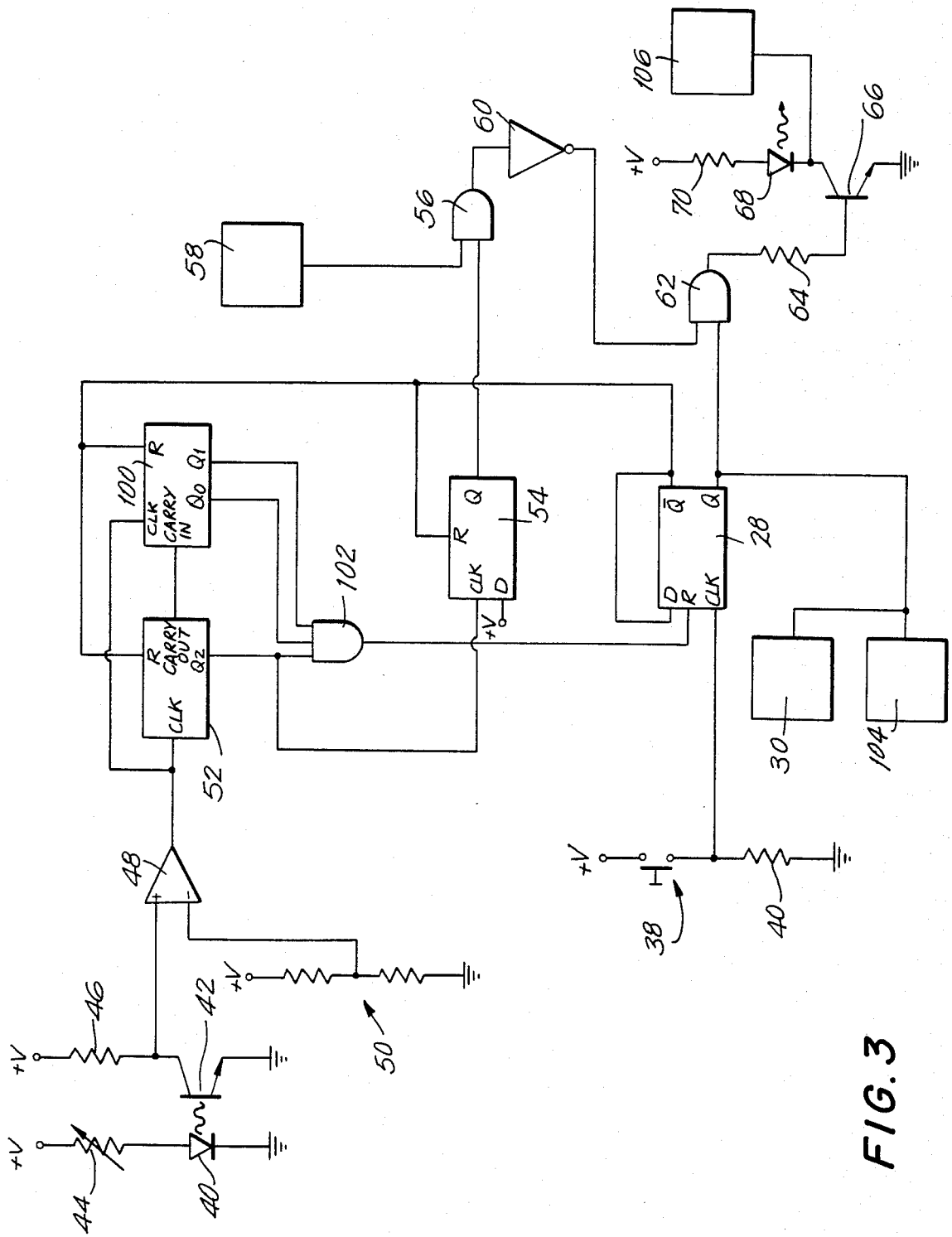
FIG. 3 is a schematic diagram of another embodiment of a control circuit for use in the present invention.

FIG. 3 illustrates an alternative embodiment of a control circuit, wherein elements corresponding to those in FIG. 2 are identified by the same reference numerals. In contrast to the circuit of FIG. 2, that of FIG. 3 is operative to stop the operation of the strip chart recorder when a predetermined amount of strip chart paper 14 has been advanced by the drive roller 12 after the detection of the proximity of the end 21 of paper 14 by the passage of indicia 19 past detector 24. For this purpose, strip chart paper for use in a recorder having the control circuit of FIG. 3 is provided with a predetermined number of indicia 19, so that the detection of such number by detector 24 (or some lesser number of indicia) may be utilized by the circuit as a means of detecting the exhaustion of the paper 14.

A second four bit synchronous counter 100 is cascaded with counter 52 by connecting the CARRY OUT terminal of the latter with the CARRY IN terminal of counter 100 and the clock input (CLK) of counter 100 to the output of comparator 48. In the example of FIG. 3, a count of 00110100 binary (i.e. 52) in counters 52 and 100 indicates the exhaustion of paper 14. A three input AND gate 102 has a first input connected to the Q2 terminal of counter 52 and its other two inputs each connected to one of the Q0 and Q1 terminals of counter 100, so that when all of these terminals first goes high (indicating that 52 indicia 19 have been detected), the output of gate 102 also goes high to indicate the exhaustion of the paper 14. The output of AND gate 102 is connected to the reset (R) terminal of flip-flop 28 to force its Q terminal low when the output of gate 102 goes high.

As in the case of the FIG. 2 embodiment, when the Q terminal of flip-flop 28 goes low, the print control circuit 30 is disabled to and the provision of enabling pulses for driving the stepping motor through its control circuit (indicated collectively with gate 36 and clock 34 by the box labelled 104 in FIG. 3) is prevented. Likewise AND gate 62 is disabled to cut off transistor 66 and prevent the pulsing of diode 68 by clock 58 (as in the FIG. 2 embodiment). The circuit of FIG. 3 is also provided with an audio signal generator 106 having an input coupled to the collector of transistor 66 and operative, when the voltage thereof goes high due to cut-off of the transistor 66, to emit an audible signal to inform the user when the paper 14 is running out and when it is exhausted. An automatic reset function is controlled by the $\bar{Q}$ terminal of flip-flop 28 which is connected to the reset (R) terminals of flip-flop 54 and counters 52 and 100. When the reset of flip-flop 28 forces its $\bar{Q}$ terminal high, the flip-flop 54 and counters 52 and 100 are automatically reset to ready them for operation when a new supply of chart paper is inserted into the recorder.

It will be readily appreciated that various other embodiments of control circuitry in addition to those of FIGS. 2 and 3 may be provided for use in the present invention. For example, the logical functions of these circuits may be implemented by a microprocessor based, firmware controlled system. In applications requiring improved noise rejection, the light sources 40 and 82 may be driven in a pulsating mode and the signals from phototransistors 42 and 84 would consequently require demodulation.

Figure 4:
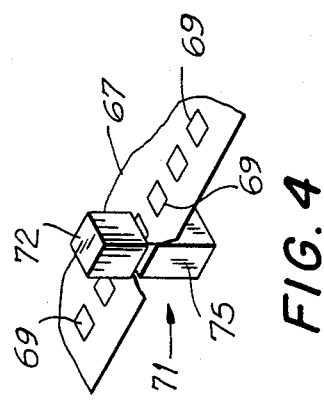
FIGS. 4, 5, 6 and 7 are partially broken away, perspective views of alternative embodiments of strip chart paper and detection devices for use with the present invention.

Referring now to FIG. 4, an alternative embodiment 67 of strip chart paper in accordance with the present invention is illustrated partially broken away. The strip chart paper 67 has a plurality of juxtaposed apertures 69 each arranged a unique predetermined distance from the terminal edge of the strip chart paper 67 and arranged parallel to a lateral edge thereof. The apertures 69 extend from a position adjacent the terminal edge toward the leading edge of the strip chart paper 67 a predetermined distance.

Also shown in FIG. 4 is an alternative embodiment of an optical detector 71 adapted to detect the passage of the apertures 69 thereby. The detector 71 is arranged adjacent to and ahead of the drive roller and print head of a strip chart recorder. When the aperture 69 nearest the leading edge of the strip chart paper 67 passes by the detector 71, the detector 71 emits a signal which indicates the proximity of the terminal edge of the strip chart paper 67. The detector 71 includes an optical transmitter 72 operative for projecting light onto the strip chart paper 67 and therethrough when the apertures 69 pass by the transmitter 72. The detector 71 also includes a photo sensitive element 75 operative to detect light from the transmitter 72 passing through the apertures 69 to emit a corresponding signal. The transmitter 72 may be, for example, a light emitting diode such as diode 40 of FIG. 2 and the photo sensitive element 75 may be, for example, a photo transistor, such as transistor 42 of FIG. 2.

Instead of providing apertures 69 in the paper 67, the same areas of the paper 67 in which the apertures are formed instead may be treated with a substance to render these areas light transmissive. For example, the paper may be treated in these areas with petroleum derived paraffin, microcrystalline waxes or high molecular weight polyoxyethylene polymers to render the areas light transmissive.

Figure 5:
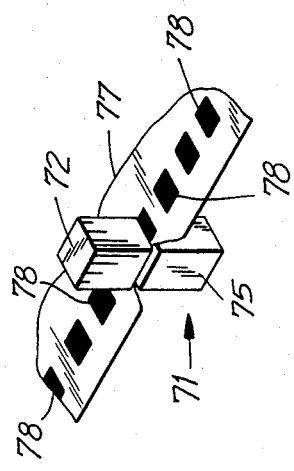

With reference now to FIG. 5, a further embodiment 76 of strip chart paper in accordance with the present invention is illustrated partially broken away and for use together with the detector 71 described above in connection with FIG. 4. The paper 77 is selected so that it is sufficiently light transmissive with respect to the light emitted by the transmitter 72 so that the photo sensitive element 75 is enabled to detect the incidence of light thereon from the transmitter 72 passing through the paper 77. In place of the apertures 69 provided in the paper 67 of FIG. 4, the paper 77 of FIG. 5 is provided with a plurality of juxtaposed printed markings 78 arranged parallel to a lateral edge of the paper 77, each marking 78 being positioned a unique predetermined distance from the terminal edge of the strip chart paper 77 and proximate to the terminal edge. The printed marks 78 absorb substantially all of the light emitted by the transmitter 72 and incident on the marks, so that they provide juxtaposed areas of contrasting light absorbency adjacent the terminal edge of the strip chart paper 77. As the terminal edge of the paper 77 draws near to the detector 71, the marks 78 pass between the transmitter 72 and the photo sensitive element 75. As each mark 78 in turn passes between transmitter 72 and element 75, the signal produced by element 75 will assume a different state to indicate the proximity of the terminal edge of the paper 77.

Figure 6:
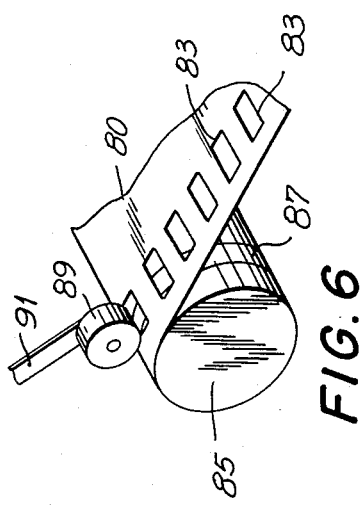

In place of the optical encoding techniques described above, the proximity of the terminal edge of the strip chart paper is detected electrically in several further embodiments of the invention. FIG. 6 illustrates a section of strip chart paper 80 having a plurality of juxtaposed apertures 83 each spaced a predetermined unique distance from the terminal edge of the paper and proximate thereto. Apertures 83 are arranged parallel to a lateral edge of the paper 80. The strip chart paper 80 is shown being driven by a drive roller 85 which has a conductive band 87 extending about the cylindrical outer surface of the drive roller 85 and axially aligned with the apertures 83 of the paper 80. An electrically conductive roller 89 is rotatably mounted on a shaft 91 which is spring biased to urge the roller 89 towards the drive roller 85 so that in the absence of paper between the roller 89 and the band 87, the roller 89 and the band 87 make electrically conductive contact. It will be appreciated, therefore, that the roller 89 and the bank 87 will not make conductive contact as the paper 80 is driven over the roller 85 until such time as the apertures 83 arrive at the roller 85 to signal the proximity of the terminal edge of the strip chart paper 80. The circuits of FIGS. 2 and 3 may be readily adapted for use with the embodiment of FIG. 5 by coupling the roller 89 and band 87 to cause a high to low transition at the non-inverting input of comparator 48 when roller 89 and band 87 make contact.

Figure 7:
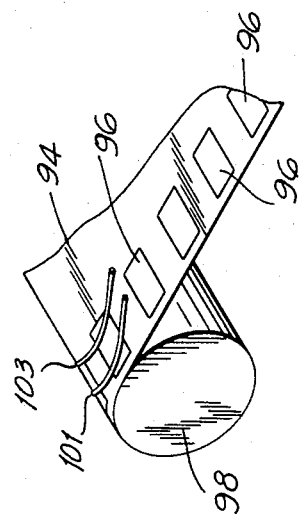

FIG. 7 illustrates a still further embodiment of the present invention wherein a section of strip chart paper 94 is provided with a plurality of juxtaposed electrically conductive areas 96 positioned in the same manner as the apertures 83 and 69, as well as areas 19 and 78 described hereinabove. The paper 94 is shown being driven over a drive roller 98 of a strip chart recorder mechanism for recording data on the strip chart paper 94. The strip chart recorder mechanism is provided with two side by side electrical contacts 101 and 103 which are spring biased toward the drive roller 98 and positioned axially to intercept the electrically conductive areas 96 of the strip chart paper 94 as they pass over the drive roller 98. The paper 94 is electrically nonconductive except in the areas 96. Accordingly, as the areas 96 pass over the drive roller 98 and are intercepted by the contacts 101 and 103, the latter form a closed circuit. It will be readily appreciated that the circuits of FIGS. 2 and 3 may be utilized with the embodiment of FIG. 7 in the same manner as the embodiment of FIG. 6.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

We claim:

1. A strip chart recorder comprising:
   a device for recording data on strip chart paper, said paper having indicia which represent the proximity of an end of the strip chart paper;
   advancing means for advancing the strip chart paper past the recording device;
   detecting means for detecting the indicia; and
   alert means operable for alerting a user of the recorder as to the proximity of the end of the paper upon detection by the detecting means of a predetermined number of said indicia wherein the alert means is operative to signal the proximity of the end of the paper only when the predetermined number of indicia are detected by the detecting means within a time period required for the advancement of the paper a predetermined distance; and wherein the detecting means comprises first counting means for producing a count signal representative of the number of said indicia detected; generating means for generating a periodic signal having a frequency proportional to the speed of advancement of the paper through the recorder; and second counting means for producing a predetermined count signal indicative of the repetition of said periodic signal a predetermined number of times; the first counting means being operative to reset upon the production of the predetermined count signal.

2. A strip chart recorder comprising:
a recording device for recording data on strip chart paper, said paper having indicia which represent the proximity of an end of the strip chart paper;
detecting means for detecting the indicia;
first counting means for producing a count value representing the number of indicia detected;
correcting means for correcting the count value produced by the first counting means to avoid erroneously interpreting extraneous markings and ambient light noise as indicia; and
alert means operable for alerting a user of the recorder as to the proximity of the end of the paper in response to the count value equaling a predetermined value.

3. A strip chart recorder as in claim 2; wherein the recorder further comprises generating means for producing a control signal and advancing means for advancing the paper past the recording device in response to the control signal; and wherein the correcting means corrects the count value in response to the control signal.

4. A strip chart recorder as in claim 3; wherein the correcting means comprises second counting means for monitoring the rate of paper advancement.

5. A strip chart recorder as in claim 4; wherein the indicia comprise a plurality of distinctive marks; and wherein the distance between next adjacent distinctive marks are equal.

6. A strip chart recorder as in claim 5; wherein the distinctive marks are identical.

* * * * *